(12) United States Patent
Steinert et al.

(10) Patent No.: US 10,197,729 B2
(45) Date of Patent: Feb. 5, 2019

(54) OPTOELECTRONIC DETECTOR, IN PARTICULAR FOR HIGH-RESOLUTION LIGHT SCANNING MICROSCOPY

(71) Applicant: Carl Zeiss Microscopy GmbH, Jena (DE)

(72) Inventors: Joerg Steinert, Jena (DE); Oliver Holub, Jena (DE); Gunther Lorenz, Jena (DE)

(73) Assignee: Carl Zeiss Microscopy GMBH, Jena (DE)

( * ) Notice: Subject to any disclaimer, the term of this patent is extended or adjusted under 35 U.S.C. 154(b) by 358 days.

(21) Appl. No.: 14/906,624

(22) PCT Filed: Jul. 18, 2014

(86) PCT No.: PCT/EP2014/065499
§ 371 (c)(1),
(2) Date: Jan. 21, 2016

(87) PCT Pub. No.: WO2015/011046
PCT Pub. Date: Jan. 29, 2015

(65) Prior Publication Data
US 2016/0209588 A1   Jul. 21, 2016

(30) Foreign Application Priority Data

Jul. 26, 2013   (DE) .................... 10 2013 012 609

(51) Int. Cl.
*G02B 6/06*      (2006.01)
*G02B 21/00*     (2006.01)
(Continued)

(52) U.S. Cl.
CPC ........... *G02B 6/065* (2013.01); *G02B 6/3652* (2013.01); *G02B 6/4249* (2013.01);
(Continued)

(58) Field of Classification Search
CPC . G02B 6/04; G02B 6/06; G02B 6/065; G02B 6/08; G02B 6/3652; G02B 6/3648;
(Continued)

(56) References Cited

U.S. PATENT DOCUMENTS

| 3,944,362 A | * | 3/1976 | Dailey | G03B 27/735 |
| | | | | 355/1 |
| 4,332,439 A | * | 6/1982 | Lubbers | G02B 6/4415 |
| | | | | 385/115 |

(Continued)

FOREIGN PATENT DOCUMENTS

| CN | 202975400 | 6/2013 |
| JP | 57-108719 | 7/1982 |
| WO | WO-2004/017114 | 2/2004 |

OTHER PUBLICATIONS

Notification of Transmittal of Translation of the International Preliminary Report on Patentability. (Application No. PCT/EP2014/065499) dated Feb. 4, 2016.

*Primary Examiner* — John Lee
(74) *Attorney, Agent, or Firm* — Nixon Peabody LLP; Jeffrey L. Costellia

(57) ABSTRACT

As a result of the size of the detector elements thereof, optoelectronic detectors such as photoelectron multipliers comprising a light-entry region sealed by a protective disc can only be used with much outlay for recording an image of a diffraction-limited focus volume in a two-dimensional spatially resolved manner, even if the image is significantly magnified in relation to the focus volume. The novel detector is intended to enable the spatially resolved detection of point spread functions with little outlay and high accuracy. 2.2 For this purpose, a body made of glass or glass ceramics comprising an opening, in which one end of an optical fiber is arranged, is cemented to the cover disc in such a way that the end of the optical fiber faces the cover disc and the (Continued)

optical axis thereof intersects the light-entry region. Thus, the relative position of optical fiber and entry region can be provided permanently with high accuracy. Preferably, the detector includes a plurality of detection channels, in particular 32 channels, comprising a respective light-entry region and the body includes a plurality of openings comprising a respective optical fiber. 2.3 Fluorescent microscopy.

23 Claims, 4 Drawing Sheets

(51) Int. Cl.
  *G02B 21/36* (2006.01)
  *H01J 43/28* (2006.01)
  *G02B 6/42* (2006.01)
  *G02B 6/36* (2006.01)

(52) U.S. Cl.
  CPC ....... *G02B 21/002* (2013.01); *G02B 21/0052* (2013.01); *G02B 21/361* (2013.01); *H01J 43/28* (2013.01)

(58) Field of Classification Search
  CPC .. G02B 6/3628; G02B 6/4246; G02B 21/002; G02B 21/0052; G02B 21/361; H01J 43/28
  See application file for complete search history.

(56) References Cited

U.S. PATENT DOCUMENTS

| | | | | |
|---|---|---|---|---|
| 4,374,325 A * | 2/1983 | Howarth | ................ | G02B 23/12 250/214 VT |
| 4,722,582 A * | 2/1988 | Modone | ................ | G02B 6/2817 385/35 |
| 4,758,064 A * | 7/1988 | Neefe | ............. | B29D 11/00663 264/1.24 |
| 4,839,635 A * | 6/1989 | Harris | ................... | G02B 6/3885 340/815.42 |
| 4,971,733 A * | 11/1990 | Baron | ..................... | G02B 6/06 264/1.24 |
| 5,042,900 A * | 8/1991 | Parker | ..................... | G02B 6/26 385/76 |
| 5,077,821 A * | 12/1991 | Makel | ..................... | G02B 6/06 250/227.24 |
| 5,359,687 A * | 10/1994 | McFarland | ............ | G02B 6/138 385/49 |
| 5,568,578 A * | 10/1996 | Ames | ....................... | G02B 6/32 385/25 |
| 5,642,449 A * | 6/1997 | Phillips | ................ | G02B 3/0031 385/120 |
| 5,862,278 A * | 1/1999 | Brauch | ............. | B23K 26/0604 385/119 |
| 7,031,578 B2 | 4/2006 | Marion et al. | | |
| 7,595,189 B2 * | 9/2009 | Vann | .................... | B01J 19/0046 422/68.1 |
| 9,168,523 B2 * | 10/2015 | Ludowise | ............. | B01L 3/5027 |
| 9,632,296 B2 * | 4/2017 | Wolleschensky | .... | G02B 21/002 |
| 2002/0080457 A1 * | 6/2002 | Nakanishi | .......... | G02B 6/12007 398/202 |
| 2003/0227628 A1 * | 12/2003 | Kreimer | .................... | G01J 3/02 356/419 |
| 2004/0037507 A1 * | 2/2004 | Marion | ................ | G02B 6/4204 385/52 |
| 2005/0018993 A1 * | 1/2005 | Rolston | ................ | G02B 6/3839 385/137 |
| 2005/0213922 A1 * | 9/2005 | Sezerman | ............ | G02B 6/3636 385/137 |
| 2006/0033038 A1 * | 2/2006 | Moses | ..................... | H01J 37/20 250/440.11 |
| 2006/0223169 A1 * | 10/2006 | Bedingham | .......... | G01N 21/645 435/287.2 |
| 2007/0019920 A1 * | 1/2007 | Tanaka | ................. | G02B 6/3636 385/137 |
| 2007/0071390 A1 | 3/2007 | Tobiason et al. | | |
| 2007/0160339 A1 * | 7/2007 | Bellekens | ............ | G02B 6/4454 385/135 |
| 2012/0327401 A1 * | 12/2012 | Fukuzawa | ............ | G01N 21/431 356/133 |
| 2013/0135715 A1 | 5/2013 | Chen et al. | | |
| 2013/0170789 A1 * | 7/2013 | Kuang | ................ | G02B 6/3636 385/14 |
| 2014/0143996 A1 * | 5/2014 | Bhagavatula | ........ | G02B 3/0087 29/428 |
| 2015/0085099 A1 * | 3/2015 | Kleppe | ............. | G02B 21/0064 348/80 |
| 2016/0041334 A1 * | 2/2016 | Suijver | ............. | A61B 1/00167 362/554 |
| 2016/0209588 A1 * | 7/2016 | Steinert | ................ | G02B 6/4249 |
| 2016/0377987 A1 * | 12/2016 | Schellenberg | ......... | B82Y 10/00 355/67 |
| 2017/0010425 A1 * | 1/2017 | Kozak | ..................... | G02B 6/04 |

* cited by examiner

OPTOELECTRONIC DETECTOR, IN PARTICULAR FOR HIGH-RESOLUTION LIGHT SCANNING MICROSCOPY

TECHNICAL FIELD

The present disclosure relates to an optoelectronic detector, in particular a photoelectronic multiplier, with a light entry range closed by a protective disk, in particular of glass, in a transparent manner and to a method for producing an optoelectronic detector.

The protective disk can serve in particular for maintaining a vacuum inside the detector. It typically consists of glass. Every electromagnetic radiation that can be manipulated with optical means is to be considered as light, in particular even ultraviolet and infrared radiation.

BACKGROUND

Such optoelectronic detectors are known in the prior art, for example, from U.S. Pat. No. 4,881,008 A. It describes a multi-channel detector in line form with several light entry areas in which each light entry area comprises its own photoelectronic multiplier and therefore forms its own detector element. These detector elements comprise a common protective disk here.

A disadvantage is the fact that the detector elements are relatively large. They can therefore only be used with great expense, according to DE 10 2012 204 128, to record an image of a diffraction-limited focus volume and therefore an image of an Airy disk or of the point-spread function, PSF in a two-dimensionally spatially resolved manner, even if the image is clearly enlarged relative to the focus volume. In particular, the intervals of the individual detector elements are so great that local modulations within the point-spread function cannot be detected. If the magnification were selected in such a manner that that the intervals were negligible, a large number of detector elements and therefore more detectors would be disadvantageously necessary in order to be able to detect the entire point-spread function.

The present disclosure has the basic problem of improving a microscope and a method of the initially cited type in order to make possible the spatially resolved protection of point-spread functions with low cost and high accuracy.

BRIEF SUMMARY OF THE INVENTION

The problem is solved by a microscope comprising the features indicated in claim 1 and by a method comprising the features indicated in claim 14. Advantageous embodiments of the present disclosure are indicated in the subclaims.

The present disclosure provides that a body consisting of glass or glass ceramic material with an opening in which one end of an optical fiber is arranged is cemented to the cover disk in such a manner that the end of the optical fiber faces the cover disk and its optical axis (of the exiting light) intersects the light entry area.

Due to the transparent fixing of the body by the cementing the relative position of the optical fiber and the entry area can be made available with high accuracy for a long time. At first, a highly accurate first positioning is achieved in that prior to the hardening of the cement the detector can be used under illumination of the optical fiber in order to maximize the optical coupling efficiency by an optical relative positioning of optical fiber and light entry area. In a corresponding manner an end of the optical fiber facing away from the cover disk can be illuminated preferably during the shifting and light exiting from the optical fiber can be detected by the detector, wherein the body is shifted until a given minimum intensity or intensity maximum is detected.

The detector of the embodiment has a high temperature stability since glass ceramic material has a very similar thermal expansion behavior like glass cover disks of optoelectronic detectors. Therefore, even in the case of temperature fluctuations the relative position of the optical fiber and of the light entry area and therefore the optical coupling efficiency remain constant.

The detector preferably has several detection channels, in particular 32, each with a light entry area and the body has several, in particular an identical number of openings, wherein in each of these openings an end of an optical fiber is arranged in such a manner that it faces the cover disk and its optical axis (of the exiting light) intercepts a light entry area associated with the particular detection channel. In this manner the long-lasting, available accuracy of the detector of the present disclosure can also be used for multi-channel detection.

It is advantageous if the optical fibers are combined at their other ends to a bundle, in particular in a very dense pack, in particular with a total hexagonal cross section. In this manner the point-spread function of a photo-scanning microscope can be recorded with high accuracy in a spatially resolved manner and analyzed, for example, in a microscope or with a method according to DE 10 2012 204 128.

Crosstalk between several channels can be minimized in that the several light entry areas of a multi-channel detector are arranged linearly adjacent to each other and the corresponding sequence of optical fibers in the bundle is arranged in a helical form because as a consequence optical fibers that arrive at the detector as neighbors can also be adjacent in the bundle.

It is preferable if the glass comprises borosilicate glass or the glass ceramic material comprises borosilicate glass, in particular if a borosilicate glass matrix is arranged in the mica, in particular fluorophlogopite mica. This composition makes possible glass-like thermal expansion properties of the body as well as an electrical insulation which is especially advantageous in high-voltage secondary electron multipliers. The glass or the glass ceramic material can be advantageously worked by machine in order to simplify the making available of the block and of the cover. Such glass ceramic material is commercially available, for example, under the trademarks "Macor" or "Vitronit".

The body preferably comprises a block with a groove in which the end of the optical fiber is arranged and comprises a cover consisting of the material of the block, wherein the groove is closed in the area of the end of the optical fiber at least in sections by the cover and forms the opening. As a result of the arrangement of a groove (or of several grooves) the optical fiber (or the several optical fibers) can be aligned with low cost and high accuracy. The body is preferably bipartite but can also comprise even other parts. Blocks provided with grooves for holding optical fibers are known, for example, from U.S. Pat. No. 7,058,275 B2, whose disclosed content in this regard is included here.

The present disclosure provides for manufacturing such an optoelectronic detector that the following steps are carried out: Making an optoelectronic detector available with a light entry area closed in a transparent manner by a cover disk, Making available a block of glass or of glass ceramic material with a groove, Positioning an end of an optical fiber in the groove, Placing a cover consisting of the material of the block on the block to close the groove at least in sections in the area of the end of the optical fiber, Fastening the cover on the block, in particular by hardening or (allowing) an adhesive to harden, Cementing the block (optionally also the cover) to the cover disk in such a manner that the end of the optical fiber faces the cover disk, and Shifting the block parallel to the protective disk until an optical axis (of the exiting light) of the end of the optical fiber intersects the light entry area.

The stability and the accuracy of the detector are especially high if the end of the optical fiber is adhered in the groove. The stability and the accuracy of the detector are even higher if the cover is adhered to the block, especially also to the optical fiber. A thermally especially high stability is achieved in that the cover comprises a groove corresponding groove of the block. As a result the slot between cover and block, which also expands upon thermal expansion, can be minimized.

The groove of the block and/or of the cover advantageously has a triangular, quadrilateral, especially rectangular or semi-elliptical, especially semi-round cross section. This achieves a stable seat of the optical fiber. The diameter of the groove must merely be sufficient to receive an optical fiber (and optional adhesive).

As an alternative to the construction with block and cover, the body, which is then constructed, for example, monolithically, can comprise a bore as opening (24a) whose smallest opening width corresponds to a greatest cross section of the optical fiber, wherein the optical fiber is adhered to the body.

The present disclosure provides for the manufacturing of such an optoelectronic detector that the following steps are carried out: Making an optoelectronic detector available with a light entry area closed in a transparent manner by a cover disk, Making available a body of glass or glass ceramic material, Boring an opening in the block, Positioning an end of an optical fiber in the opening, Fastening the optical fiber on the body, in particular by hardening or (allowing) an adhesive to harden, Cementing the body to the cover disk in such a manner that that the end of the optical fiber faces the cover disk, and Shifting the body parallel to the protective disk until an optical axis (of the exiting light) of the end of the optical fiber intersects the light entry area.

In a first variant of an embodiment the optical fiber ends flush with the edge of the body (2X), in particular of the cover (4). As a result a high optical coupling efficiency can be achieved without additional expense. In a first variant of an embodiment the optical fiber ends a certain distance before to the edge of the body (2X), in particular of the cover (4). Then, a lens, in particular a diffractive lens, for example, according to EP 1635204A1, a collective lens or a collimation lens is preferably arranged between the end of the optical fiber and the edge of the body (2X), in particular of the cover (4). As a consequence, the optical coupling efficiency is improved and an expensive subsequent polishing of the fibers can be eliminated.

It is especially advantageous if the body (in particular consisting of block and cover) and the cover disk and optionally other structural components that are connected in a thermally conductive manner to the cover disk are sealed against a surrounding atmosphere by a sealing mass, in particular a polymeric sealing mass (at atmospheric pressure) tightly against water vapor. In this manner a condensation on the cover disk can be avoided upon cooling of the detector. In particular, the sealing mass also occupies the slot between block and cover.

The present disclosure also comprises a photo-scanning microscope, in particular a confocal laser scanning microscope with a microscope objective and a detector as previously described with several detection channels, wherein the ends of the optical fibers remote from the detector are arranged in particular as a bundle for receiving light from the direction of the microscope objective in an image plane of the microscope objective or behind an aperture arranged in the image plane.

In an advantageous embodiment of the method of the present disclosure a polishing is carried out after the fastening of the optical fiber or of the cover and before the cementing of the end of the optical fiber. This can achieve a high optical coupling efficiency.

In general, the present disclosure is advantageous not only with a multi-channel detector but also with a single-channel detector, in particular with a single secondary electronic multiplier. The present disclosure is described in detail in the following using exemplary embodiments.

Figure 1:
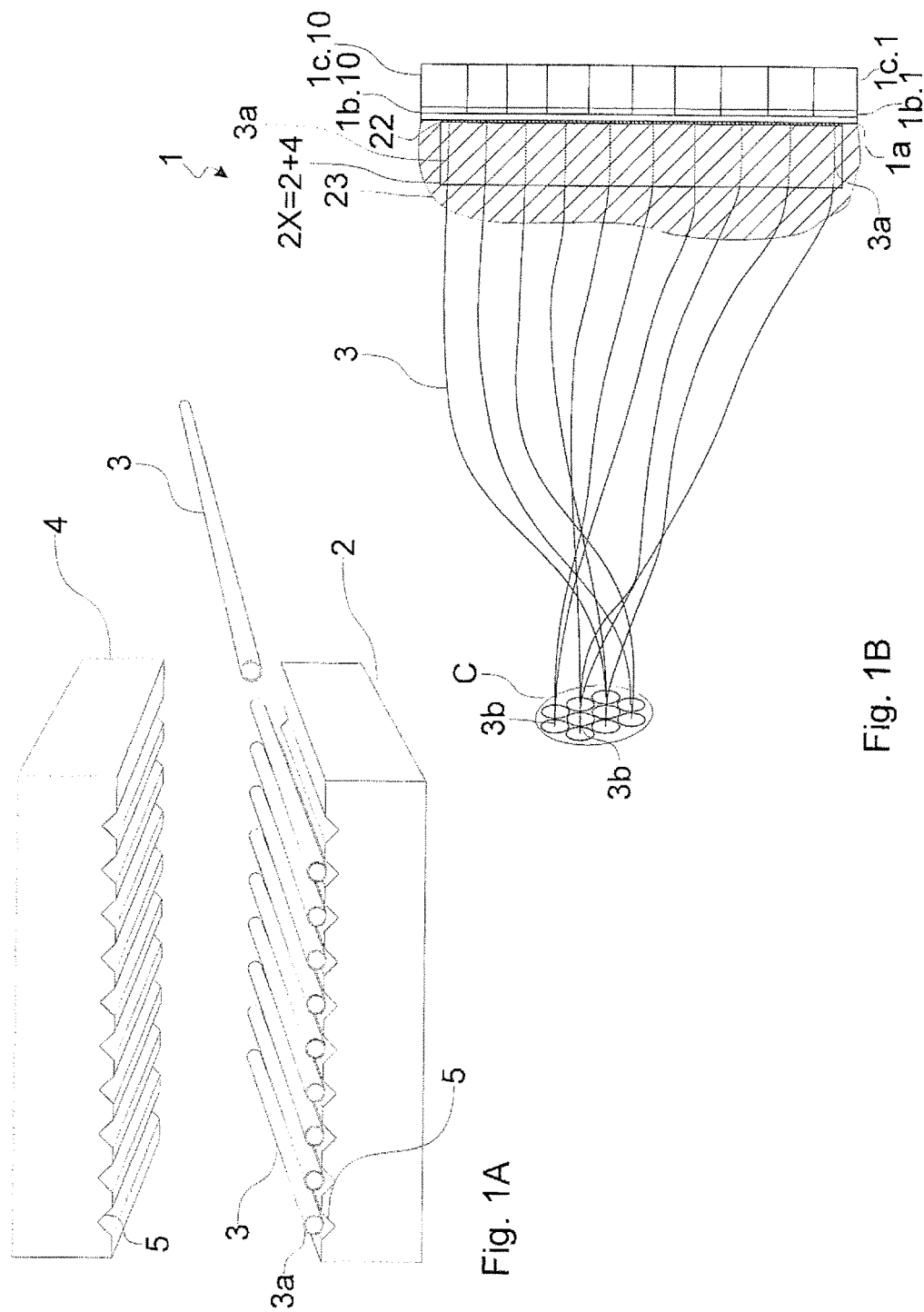
FIG. 1 shows a photo-electronic multiplier in accordance with the present disclosure.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

FIG. 1 shows by way of example a multi-channel photo-electronic multiplier as optoelectronic detector 1 with a cover disk 1a in a schematic view. For the sake of clarity the detector 1 comprises only 10 channels with a particular light entry range 1b.i (i=1 ... 10) and a particular dynode cascade 1c.i. Partial FIG. 1A shows an enlarged section of partial FIG. 1B in which it can be recognized that the ends 3a of optical fibers 3 are arranged in V-shaped grooves 5 of a block 2 consisting of Macor glass ceramic material. A cover 4 of the same material with corresponding grooves 5 is made available for clamping the optical fibers firmly between cover 4 and block 2. The grooves can be made available, for example, by milling with customary tools. Block 2 and cover 4 are advantageously adhered to one another and therefore form one body.

The other ends 3b of the optical fibers 3 are combined in a very dense pack to a bundle C which serves as the light entry of detector 1. The optical fibers 3 can be melted to each other on the optical fiber entry bundle C. This achieves a higher filling factor, i.e., gaps between the individual optical fibers 3 on the optical fiber bundle entry 3b are minimized. On the other hand, the melting leads to a certain crosstalk between adjacent optical fibers 3. If it is desired to avoid this, the optical fibers 3 can be adhered to each other. Also, a quadratic shape of the ends of the optical fibers 3 (at least of the fiber cores and/or of the jacket and/or of the casing) is possible (not shown).

The (connected and optionally polished) holding body consisting of block 2 and cover 4 is fastened on the cover disk 1a by putty 22, for example, epoxide resin, which is at least partially transmitting for the electromagnetic radiation to be detected. As a result the end 3a of the optical fiber 3 faces the cover disk 1a and its optical axis intersects the light entry area 1b. The putty advantageously has a refractive index that is approximately equal to the refractive index of the cover disk. Ideally, its refractive index is located between that of optical fiber 3 and that of cover disk 1a.

The block 2 together with cover 4 and the hold ends 3a of the optical fibers 3 is encapsulated together with the cover disk 1a by moisture-proof polymer mass 23. The polymer mass can advantageously comprise a norbornene derivative which is commercially available, for example, under the trademark Zeonex. This material has the advantage of a low moisture absorption so that almost no air moisture can pass to the cover disk 1a by diffusion.

Figure 2:
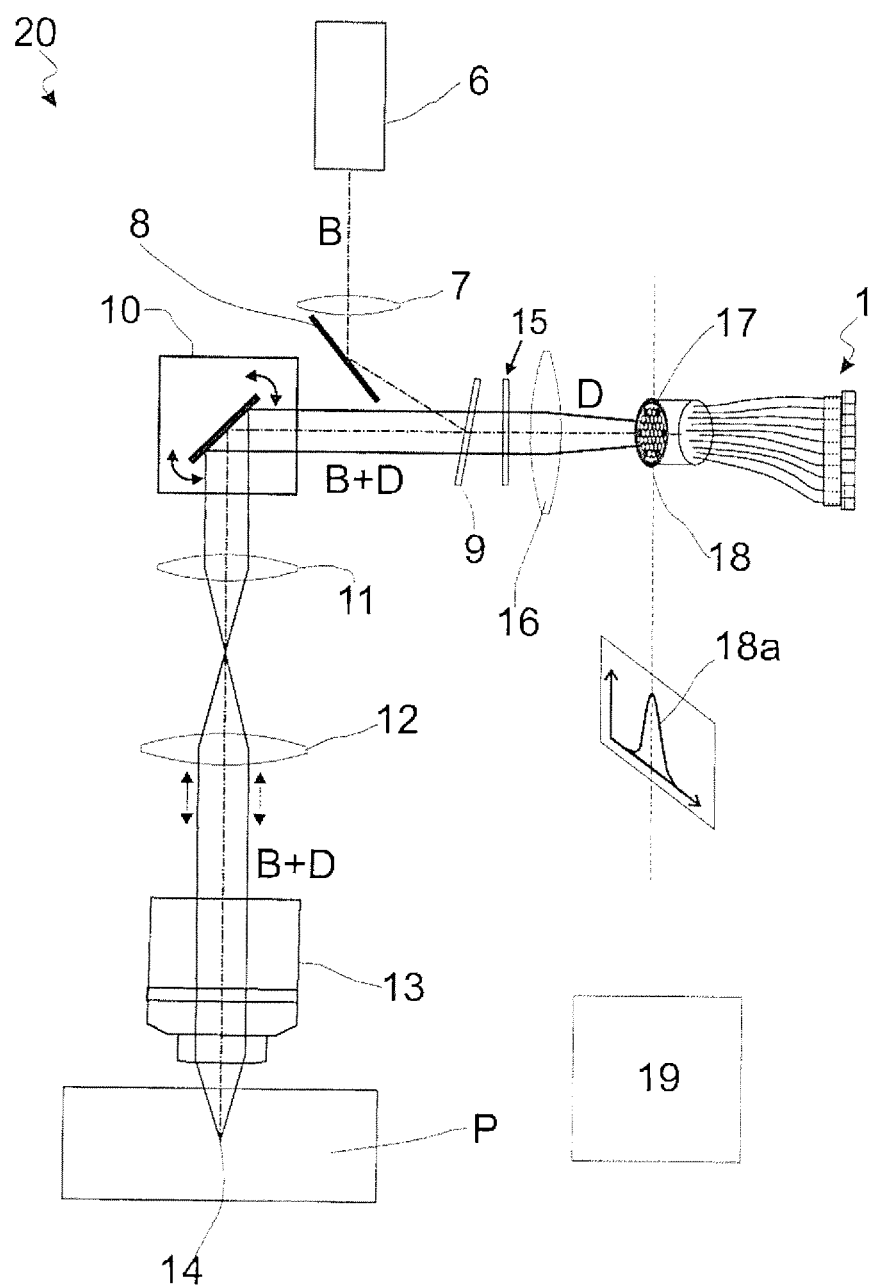
FIG. 2 shows a photo-scanning microscope with such a photo-electronic multiplier.

FIG. 2 schematically shows a photo-scanning microscope 20 in the form of a confocal laser scanning microscope (abbreviated in the following as LSM), which is designed for examining a specimen P with a microscope. The LSM 20 is controlled by a control device 19 and comprises an illumination beam path B and an image beam path D. The illumination beam path B illuminates a focus volume in the specimen P and the image beam path D illustrates this focus volume in a diffraction-limited manner into the image plane 18 for detection. The illumination beam path B and the image beam path D share a plurality of elements. However, this is just as little necessary as a scanning illumination of the specimen P. The latter could instead also be illuminated in a wide field.

The illumination of the specimen P takes place in the LSM 20 by a ready laser 6 that is coupled in via a lens 7 on a mirror 8. The mirror 8 ensures that the laser beam falls onto an admission filter 9 under a reflection angle. For the sake of a clearer view only the main axis is sketched in for the laser beam (the optical axis of the illumination beam path B).

After being reflected on the admission filter 9 the laser beam is deflected in two axes by an adjustable deflection unit 10, for example, a MEMS-based mirror, for example, and focused by lenses 11 and 12 through a microscope objective 13 in a focus volume 14 in the specimen P. The focus volume 14 is shown in dots in the view of FIG. 2; however, a linear focus volume (or other geometric forms, e.g., elliptical) is/are possible. Fluorescent radiation excited into the spot 14 is guided via the objective 13, the lenses 11 and 12 to the scanner 10 again, behind which a light beam running along the optical axis is again present in the direction of the image (independently of the scanner position). This light beam falls through the emission filters 9 and 15 which have the function of selecting the fluorescence radiation out of the focus volume 14 as regards its wavelength and to separate it in particular from the illumination radiation of the laser 6, which can serve, for example, as stimulation radiation. A lens 16 ensures that on the whole the spot 14 is imaged in a diffraction-limited image 17 which lies in a detection plane 18. The detection plane 18 is a conjugated plane to plane in which the spot 14 lies in the specimen P. Alternatively, a pinhole can be arranged in a conjugated plane connected in front. The image 17 of the spot 14 is received in the detection plane 18 by a detector device 1. It is essential here that the detector device 1 spatially resolves the diffraction-limited image 17 of the spot 14 in the detection plane 18 as a result of which details of the point-spread function 18a of the microscope 20, in particular spatial modulations of the PSF, can be detected.

The control device 19 controls all components of the LSM 20, in particular the deflection unit 10 and the detector device 1. The control device 19 records the data of each individual PSF image 17 for different deflection positions of the scanner 10, analyses its diffraction structure and produces in accordance with DE 10 2012 204 128 a high-resolution total image of the scanned area of the specimen P.

Figure 3:
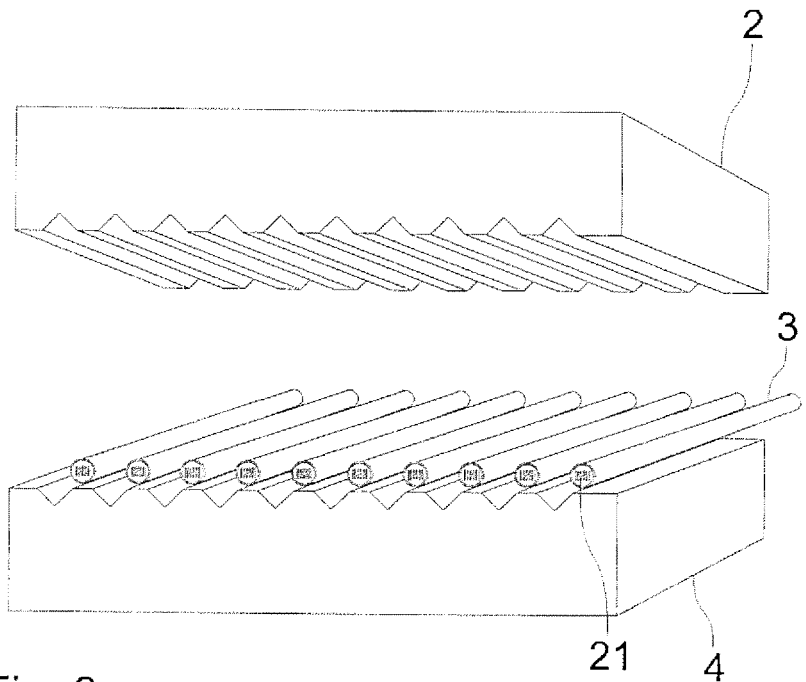
FIG. 3 shows a variant of an arrangement with rebounding optical fibers and additional lenses.

FIG. 3 shows a section of an alternative embodiment of a detector 1 in a schematic view. In contrast to the embodiment according to FIG. 1 the optical fibers 3 rebound opposite the edges of block 2 and cover 4. Furthermore, by way of example a diffractive lens 21 according to EP 1635204 A1 is applied on the ends of the optical fibers 3 held between block 2 and cover 4 which make possible a more efficient coupling in of the light exiting from the fibers into the particular detector element.

Figure 4:
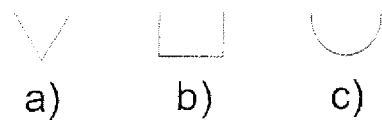
FIG. 4 shows different shapes of groove cross sections.

Finally, FIG. 4 shows different cross-sectional shapes of grooves 5 of the block 2: a) V-shaped, b) rectangular, c) semi-round. The grooves 5 of the cover 4 can have a cross-sectional shape that deviates from or is identical to that of block 2. It is also possible that adjacent grooves 5 of the block 2 (and/or of the cover 4) have different cross-sectional shapes.

Figure 5:
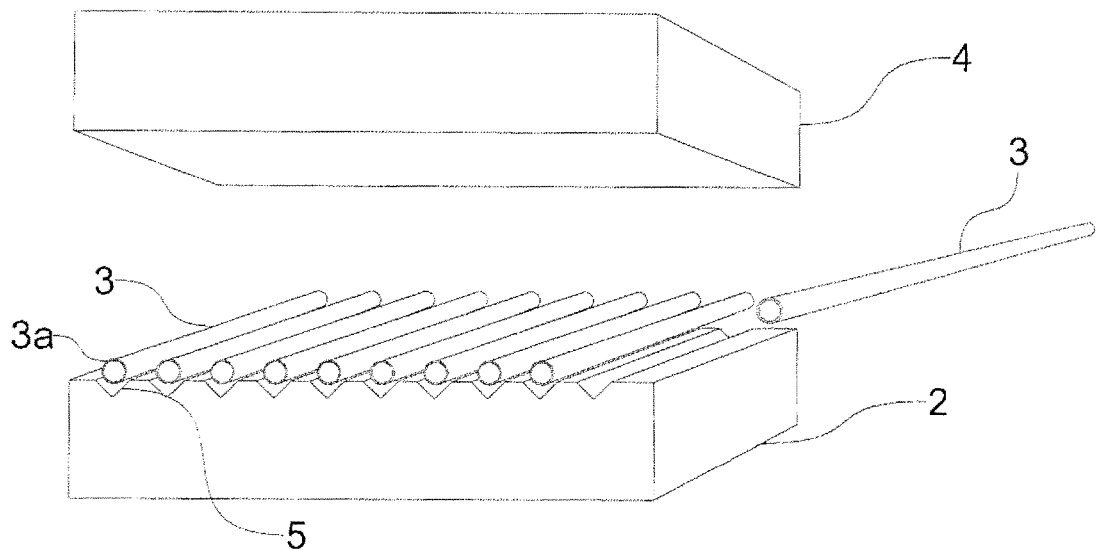
FIG. 5 shows an alternative embodiment with a cover without grooves.

FIG. 5 shows an alternative cover 4 without grooves that can be used with all shapes of the block 2.

Figure 6:
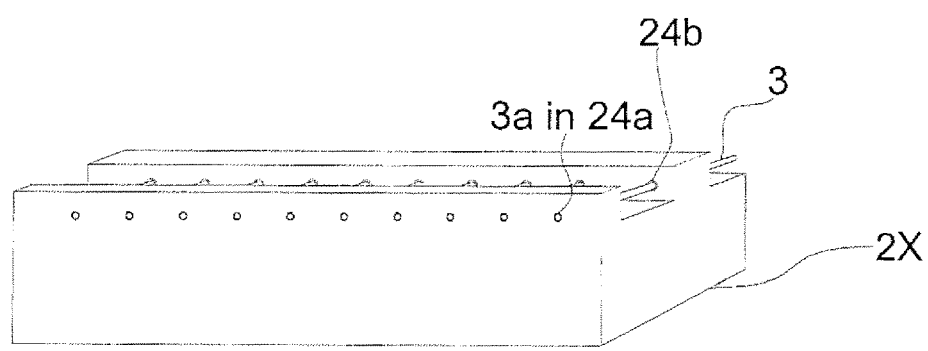
FIG. 6 shows an alternative embodiment with monolithic body.

FIG. 6 schematically shows an embodiment in which a monolithic body 2X in an edge section has bores whose cross section corresponds to the cross section of the fiber ends 3a, for example, 125 µm, as openings 24a. This edge area is provided for being cemented to the cover disk 1a of the detector. In another section bores 24b of the second type are provided that have a greater cross section and serve to guide the optical fibers 3. The optical fibers 3 are adhered to the body 2X.

The invention claimed is:

1. An optoelectronic detector, comprising:
   a photoelectronic multiplier, with a light entry range closed by a cover disk consisting of glass, in a transparent manner, and
   a body consisting of glass or glass ceramic material with an opening in which one end of an optical fiber is arranged,
   wherein the body is cemented to the cover disk in such a manner that the end of the optical fiber faces the cover disk and its optical axis intersects the light entry area.

2. The optoelectronic detector according to claim 1, wherein the optoelectronic detector comprises several detection channels, each with a light entry area and the body has an identical number of openings, wherein in each of these openings an end of an optical fiber is arranged in such a manner that it faces the cover disk and its optical axis intercepts a light entry area associated with the particular detection channel.

3. The optoelectronic detector according to claim 2, wherein the optical fibers are combined at their other ends to a bundle with a dense pack with a total hexagonal cross section.

4. The optoelectronic detector according to claim 3, wherein the several light entry areas are arranged linearly adjacent to each other and the corresponding sequence of optical fibers in the bundle is arranged in a helical form.

5. The optoelectronic detector according to claim 1, wherein the glass comprises borosilicate glass or the glass ceramic material comprises borosilicate glass, wherein the borosilicate comprises fluorophlogopite mica.

6. The optoelectronic detector according to claim 1, wherein the body comprises a block with a groove in which the end of the optical fiber is arranged and comprises a cover consisting of the material of the block, wherein the groove is closed in the area of the end of the optical fiber at least in sections by the cover and forms the opening.

7. The optoelectronic detector according to claim 6, wherein the end of the optical fiber is adhered into the groove.

8. The optoelectronic detector according to claim 6, wherein the cover is adhered to the block and to the optical fiber to form one body.

9. The optoelectronic detector according to claim 6, wherein the cover has a groove corresponding to the groove of the block.

10. The optoelectronic detector according to claim 9, wherein the groove of the block and of the cover has a triangular, quadrilateral, or semi-elliptical cross section.

11. The optoelectronic detector according to claim 1, wherein the body comprises a bare as opening whose smallest opening width corresponds to a greatest cross section of the optical fiber, wherein the optical fiber is adhered to the body.

12. The optoelectronic detector according to claim 1, wherein the optical fiber ends flush with the cover.

13. The optoelectronic detector according to claim 1, wherein the optical fiber is arranged relative to the cover with a diffractive lens, a collective lens or a collimation lens between the end of the optical fiber and the cover.

14. The optoelectronic detector according to claim 1, wherein the body is sealed tightly against water vapor against a surrounding atmosphere by a polymeric sealing mass.

15. A photo-scanning microscope, comprising a confocal laser-scanning microscope, comprising a confocal laser scanning microscope with a microscope objective and a detector according to one of the previous claims with several detection channels, wherein the ends of the optical fibers remote from the optoelectronic detector are arranged in particular as a bundle for receiving light from the direction of the micro-scope objective in an image plane of the microscope objective or behind an aperture arranged in the image plane.

16. A method for manufacturing an optoelectronic detector, the method comprising:
    making an optoelectronic detector available, wherein the optocelectronic detector comprises a photoelectronic multiplier with a light entry area closed in a transparent manner by a cover disk consisting of glass,
    making available a block of glass or of glass ceramic material with a groove,
    positioning an end of an optical fiber in the groove,
    placing a cover consisting of the material of the block on the block to close the groove at least in sections in the area of the end of the optical fiber,
    fastening the cover on the block, in particular by hardening or (allowing) an adhesive to harden,
    cementing the block to the cover disk in such a manner that the end of the optical fiber faces the cover disk, and
    shifting the block parallel to the protective disk until an optical axis of the end of the optical fiber intersects the light entry area.

17. A method for manufacturing an optoelectronic detector, the method comprising:
    making an optoelectronic detector available, wherein the optoelectronic detector comprises a photoelectronic multiplier with a light entry area closed in a transparent manner by a cover disk consisting of glass,
    making available a body of glass or glass ceramic material,
    boring an opening in the block,
    positioning an end of an optical fiber in the opening,
    fastening the optical fiber on the body, in particular by hardening or (allowing) an adhesive to harden,
    cementing the body to the cover disk in such a manner that that the end of the optical fiber faces the cover disk, and
    shifting the body parallel to the protective disk until an optical axis of the end of the optical fiber intersects the light entry area.

18. The method according to claim 17, wherein during the shifting an end of the optical fiber facing away from the cover disk is illuminated and light exiting from the optical fiber is detected by the optoelectronic detector, wherein the block is shifted until a given minimum intensity or intensity maximum is detected.

19. The method according to claim 16, wherein a polishing is carried out after the fastening of the optical fiber or of the cover and before the cementing of the end of the optical fiber.

20. A method according to claim 17, wherein a polishing is carried out after the fastening of the optical fiber or of the cover and before the cementing of the end of the optical fiber.

21. The optoelectronic detector according to claim 1, wherein the glass or the glass ceramic material can be worked by machine.

22. The method according to claim 16, wherein the glass or the glass ceramic material can be worked by machine.

23. The method detector according to claim 17, wherein the glass or the glass ceramic material can be worked by machine.

* * * * *